May 5, 1970     H. A. DE KOSTER     3,509,715
ELECTRONIC CLOCKS
Filed Feb. 1, 1966     11 Sheets-Sheet 1
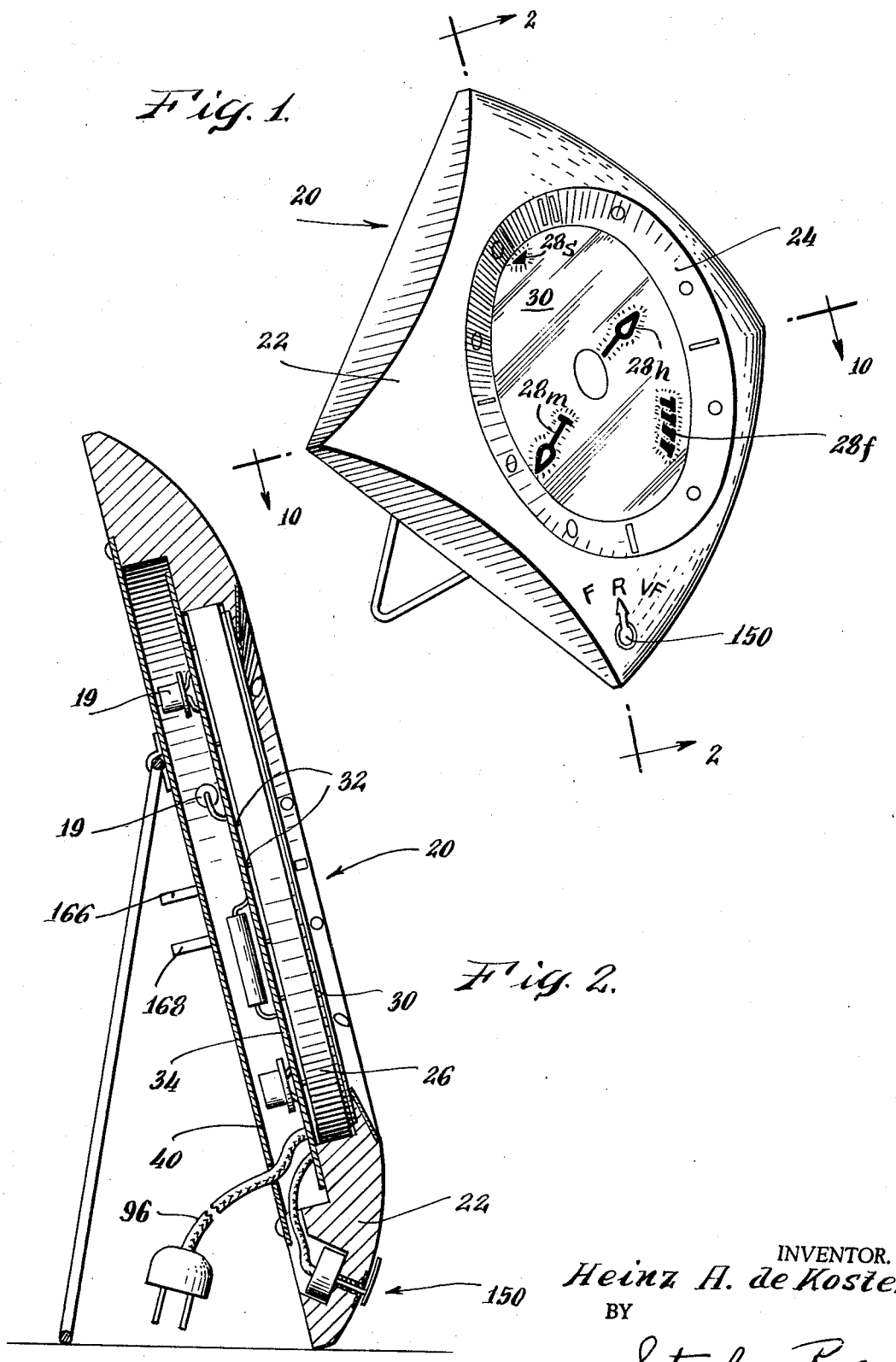
INVENTOR.
Heinz H. de Koster
BY
Stephen Roen

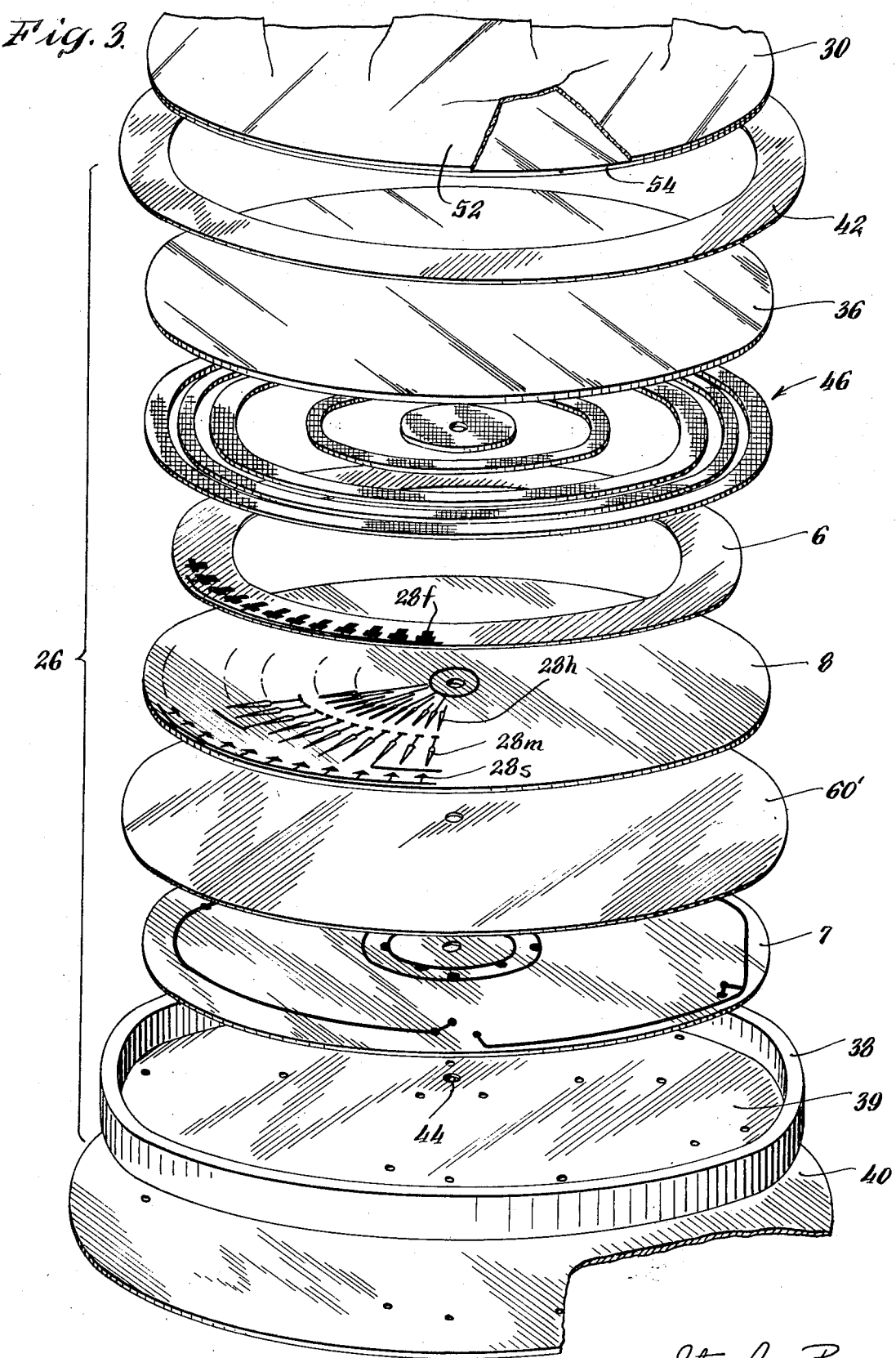

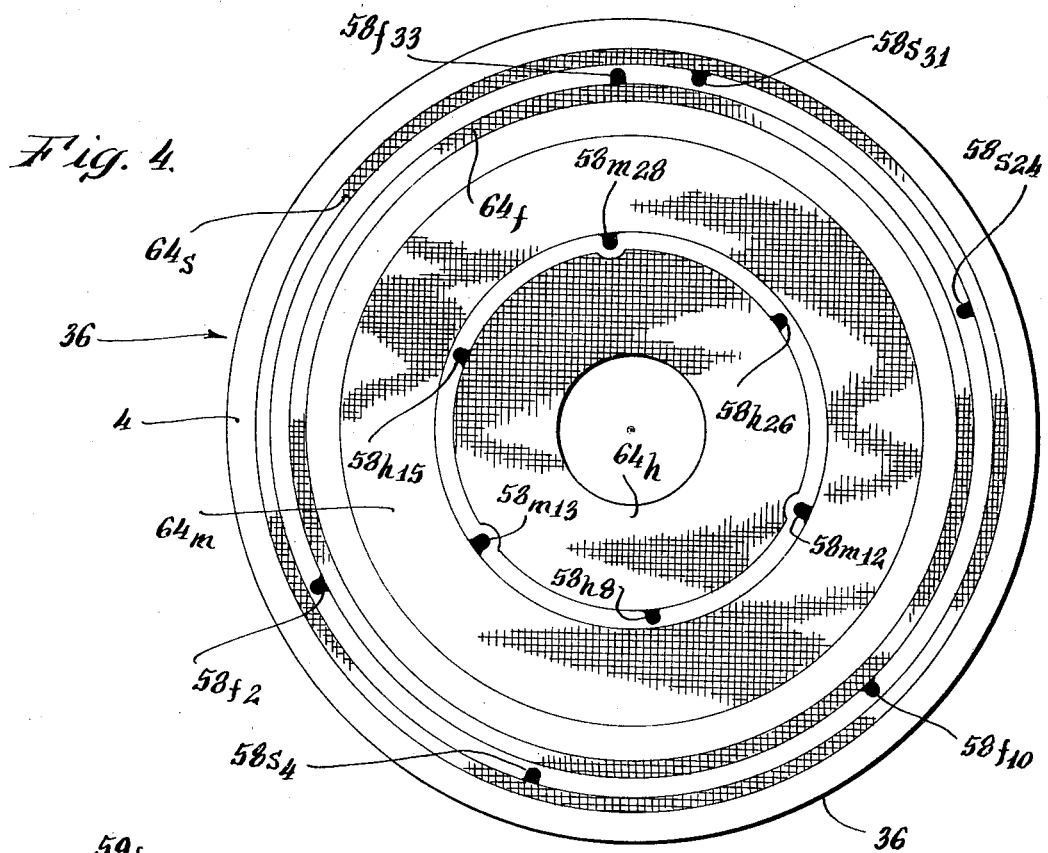
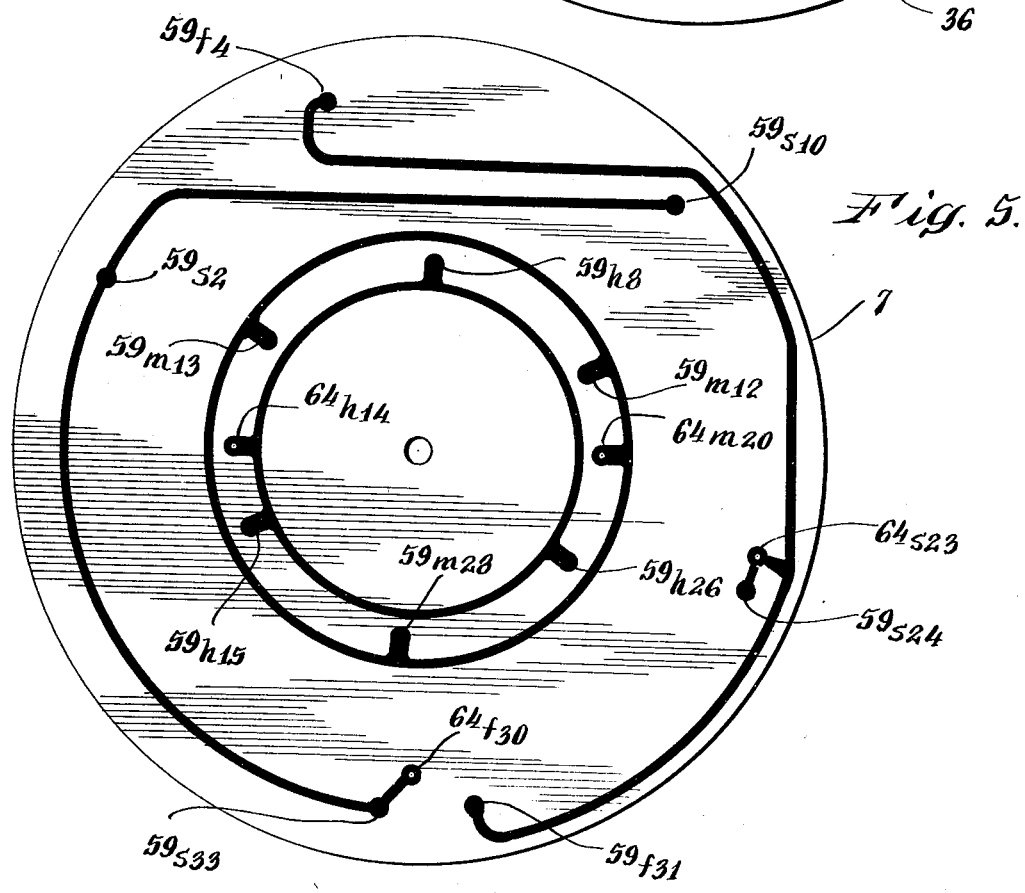

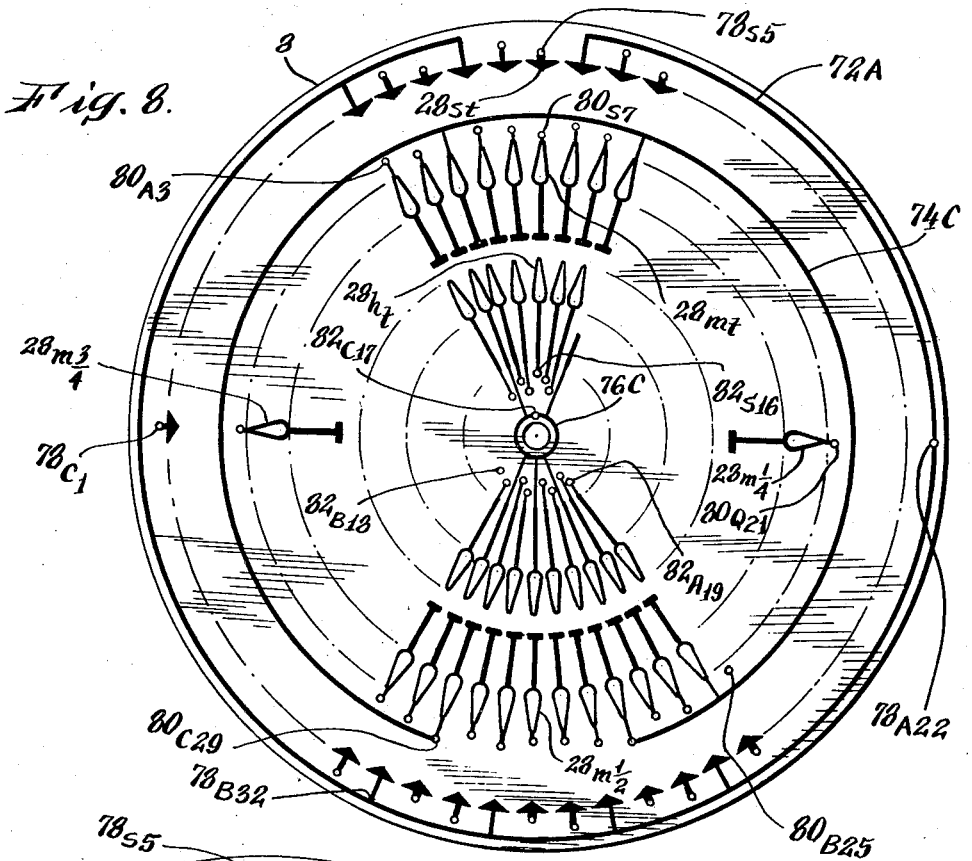
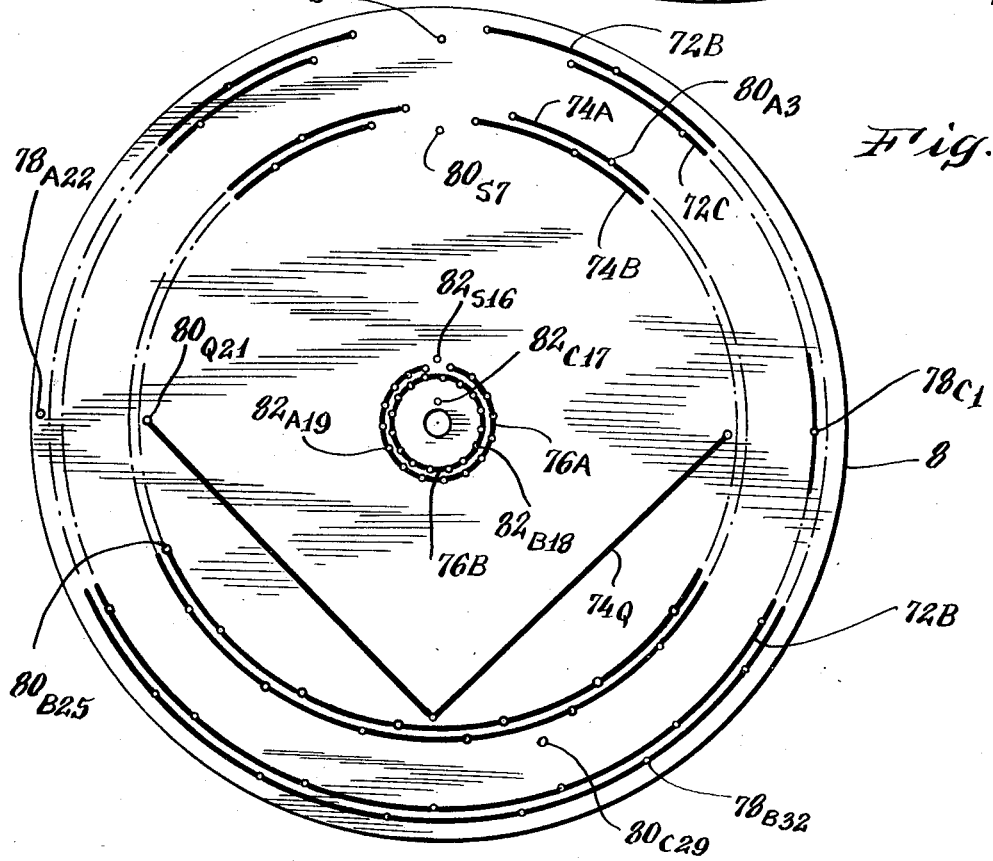

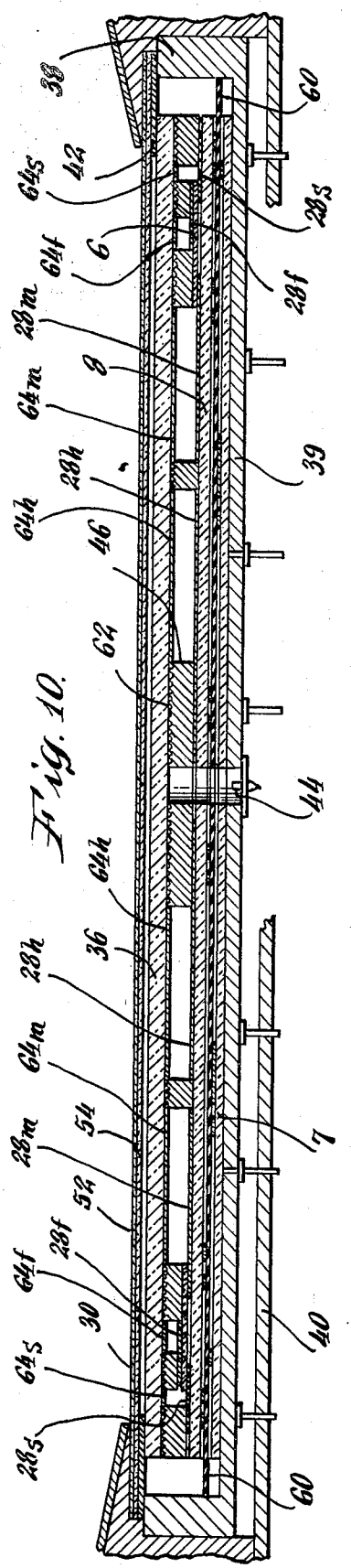
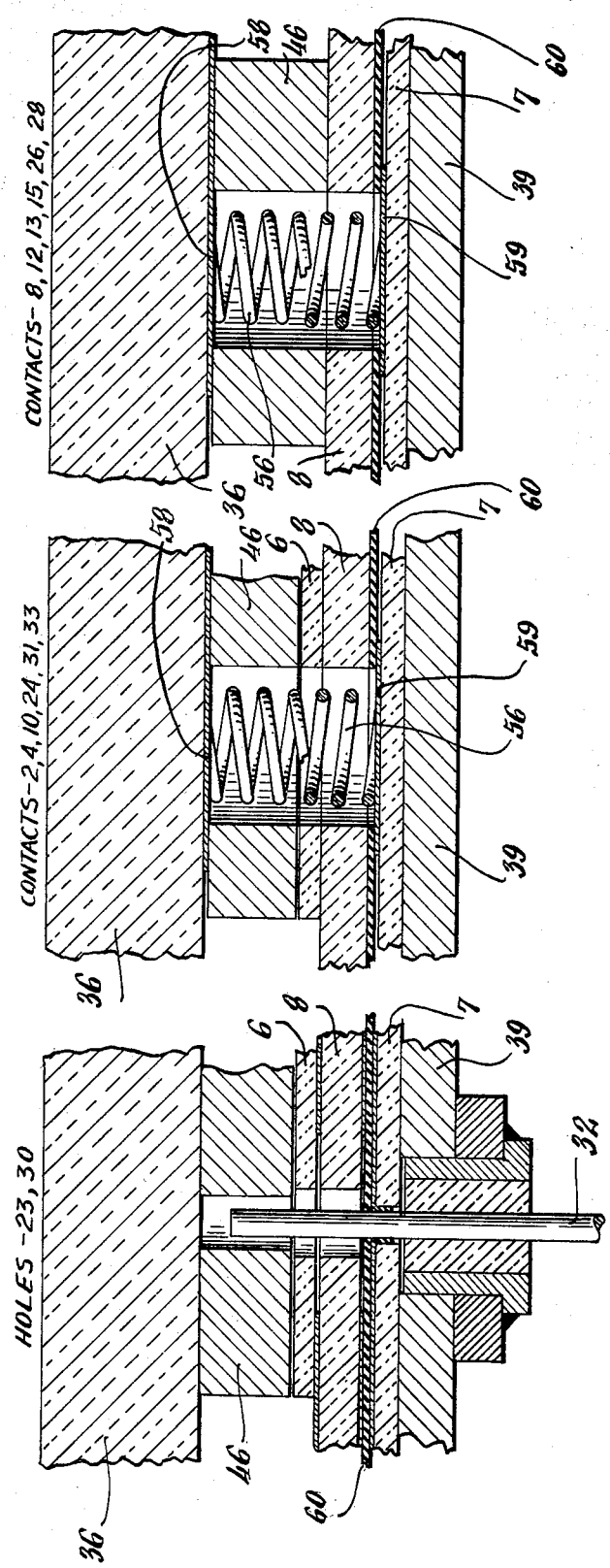

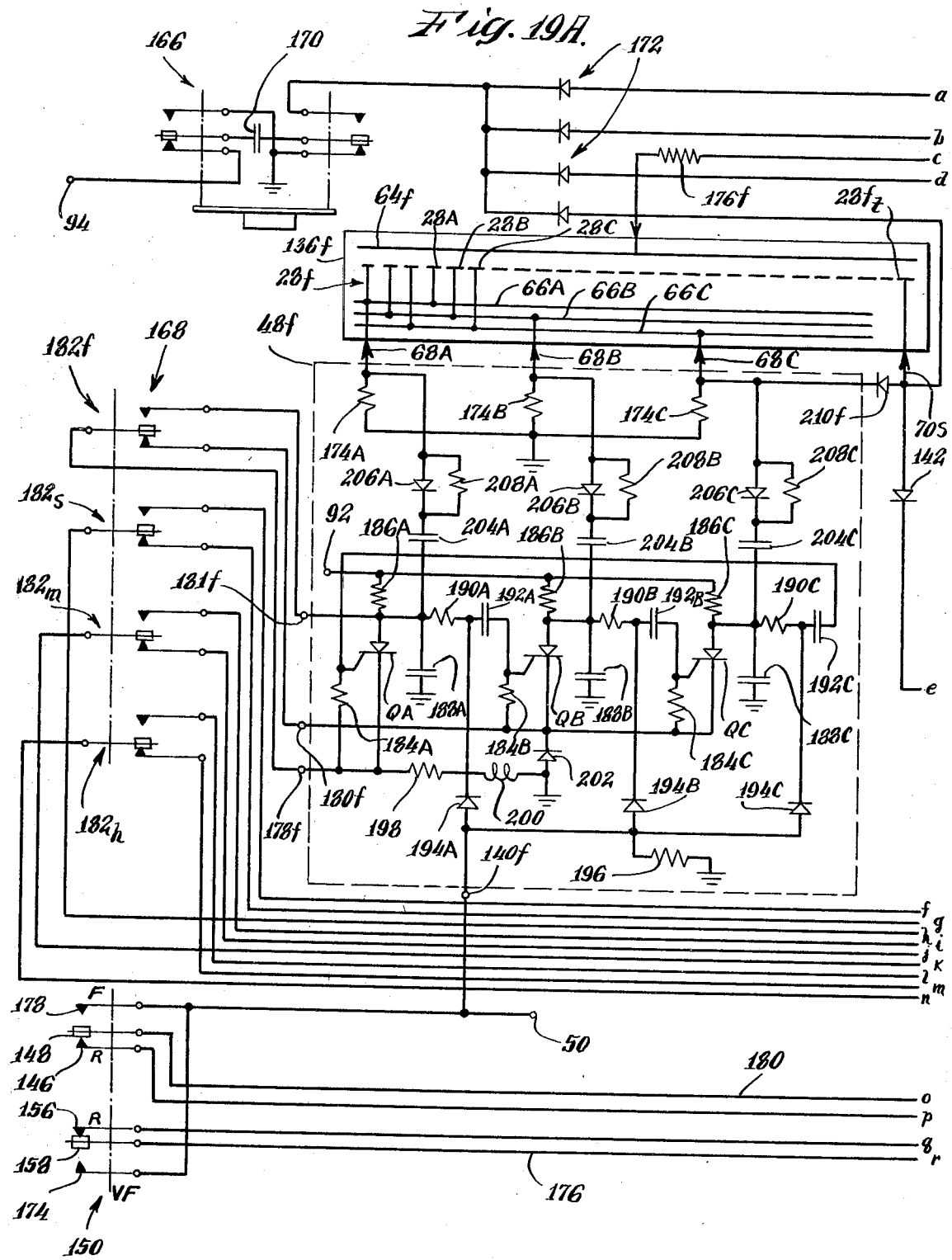

| FIG. 19A | FIG. 19B | FIG. 19C | though
United States Patent Office 3,509,715
Patented May 5, 1970

3,509,715
ELECTRONIC CLOCKS
Heinz A. de Koster, Stamford, Conn., assignor to General Time Corporation, New York, N.Y., a corporation of Delaware
Filed Feb. 1, 1966, Ser. No. 524,027
Int. Cl. G04b *19/30*
U.S. Cl. 58—50                                      9 Claims

ABSTRACT OF THE DISCLOSURE

An improved electronic counting system which may be used as a time keeping system, including a glow discharge tube containing an ionizable gas and a series of spaced internal electrodes. The electrodes are arranged in a plurality of annular series so that the transfer of glow discharges along the electrode series simulate the appearance of clock hands. The glow discharge tube is generally thin and flat, and the cathodes are formed on the surface of a thin and flat substrate within the tube. The electronic control system for transferring the glow discharges around the electrode series includes a circuit board mounted parallel and adjacent to the substrate member so as to provide a compact assembly.

---

This invention relates to electronic clocks. More particularly, it relates to a practical electronic clock employing cold cathode gas discharge techniques, so-called "glow cathodes," for counting and time indication.

A self-contained clock comprises: a stable oscillator, e.g., a pendulum, balance wheel, tuning fork, or electronic oscillator; means for counting the oscillations of the oscillator, e.g., an escapement, synchronous motor, or electronic counter; and, means for displaying a time indication (that is, the total count), e.g., hands, dials, or other display means. Most electric clocks that operate off electric power lines are of the synchronous variety. That is, they contain no oscillator themselves but rely on the oscillations of the power line potential and, in effect, count these oscillations. It will thus be seen that an electric clock, particularly an electronic clock, is merely a special form of counter that counts uniformly-timed pulses and displays the count on the basis of sixty seconds per minute and sixty minutes per hour up to twelve hours. For that reason, the words counter and clock will often be used interchangeably herein and where each term is used, the other is also meant whenever the sense permits.

An all electronic clock with no moving parts has long been considered a desirable goal. The clock could count the oscillations of the power line potential as is done by a synchronous clock. However, simple, inexpensive means have not been available for performing this counting function. For example, cascaded binary counters, as disclosed in U.S. Pat. No. 2,410,156 of L. E. Flory, even if transistorized are prohibitively expensive for most clock applications. Furthermore, electronic clock display means of the prior art are in large measure unsatisfactory. For example, Flory discloses a plurality of neon tubes, twelve separate tubes to indicate the hour and sixty tubes to indicate the minute; thus requiring seventy-two separate circuit connections to his counter.

Various other types of electronic displays have been proposed, such as in A. Mc Nicolsen U.S. Pats. Nos. 2,055,982 and 2,114,500 and in H. S. Polin, U.S. Pat. No. 3,195,011. The latter patent proposes the use of binary counters to convert the line frequency to one pulse per minute, the use of six decade glow discharge tubes to count the minutes, and a separate display tube for displaying the minute indication; the hour indications being similarly counted and displayed. None of these prior art systems have proved practicable for mass-produced inexpensive clocks.

Cold cathode glow discharge devices have long been employed in counters for both counting and display, the glow discharge being stepped from one position cathode to another by an input pulse—the position of the glow indicating the count. However, these tubes are presently mass-produced with ten position cathodes and thus may not conveniently be used to simultaneously count and display sixty seconds or sixty minutes; hence, the use of a separate display tube in the above-identified Polin patent Canadian Pat. No. 696,292 discloses a clock wherein four glow discharge counting and display tubes are arranged within a single envelope. These comprise sixty position cathodes for counting the power line pulses, sixty position cathodes for counting second pulses, sixty position cathodes for counting minute pulses, and thirty-six position cathodes for counting and indicating the hours. However, this clock, being constructed in accordance with the prior art glow cathode counting tubes, requires a pair of transfer or guide cathodes between each position cathode for transferring the glow from one position cathode to the other. Thus, there are in fact three times as many cathodes within the envelope of the clock as required for time indication. Each of these cathodes is a vertically oriented pin upstanding from a circuit board. As will be obvious to those versed in the art of constructing electron tubes, the construction of such an electron tube, having six hundred and forty-eight cathodes, four anodes, one for each array of cathodes, and innumerable interconnections both internal and external to interstage circuitry, is prohibitively expensive for all but the most exotic clock applications.

The production of an envelope for an electronic clock utilizing glow cathodes to count or display is an important problem. For example, if the clock is to be eight inches in diameter, the stresses to which the envelope can be subjected at fourteen pounds per square inch are quite tremendous. Furthermore, the required feedthrough connections to the outside of the envelope—the "pins"— weaken the envelope at the places where they feed through. According to the prior art, this would require an all glass envelope, having a diameter of nine and a quarter inches, shaped somewhat like a flattened television tube having a length of four inches from the front of the face to the end of the stem where the pin connections pass through the glass. Such an envelope would be quite bulky, rather heavy, and expensive.

It is, therefore, an object of the present invention to provide an electronic clock.

Another object of the invention is to provide an electronic clock having no moving parts.

Still another object of the invention is to provide an electronic clock suitable for operation off a power line and synchronized thereby.

Yet another object of the invention is to provide an electronic clock employing glow cathodes for counting and displaying time indications.

A further object of the invention is to provide an electronic clock suitable for short time measurements.

A still further object of the invention is to provide an electronic clock which is easy to set.

A yet further object of the invention is to provide an electronic clock providing time indications simulating the appearance of the hands of an ordinary clock dial.

Another object of the invention is to provide an electronic clock of the above character by printed circuit techniques.

Still another object of the invention is to provide such an electronic clock which is flat and thin.

Yet another object of the invention is to provide such an electronic clock in which only the glowing cathodes indicating the time are visible to an observer.

A further object of the invention is to provide simple means for synchronously driving such an electronic clock from a power line.

Yet a further object of the invention is to provide simple means for interconnecting multi-layer printed circuits.

Yet a further object of the invention is to provide electronic counters of the character of the above-described electronic clock.

Another object of the invention is to provide such electronic clocks and counters employing no guide or transfer cathodes.

Still another object of the invention is to provide drive circuits for electronic clocks and counters of the above character.

Yet another object of the invention is to provide drive circuits of the above character which are standard, may be mass-produced for driving counters providing differing total counts, and several of which may be employed in a single electronic clock.

A further object of the invention is to provide such electronic clocks and counters that are rugged, durable, long-lived, and may be mass-produced inexpensively.

Other objects of the invention will in part be obvious and will in part appear hereinafter.

The invention accordingly comprises the features of construction, combinations of elements, and arrangements of parts which will be exemplified in the construction hereinafter set forth and the scope of the invention will be indicated in the claims.

For a fuller understanding of the nature and objects of the invention, reference should be had to the following detailed description taken in connection with the accompanying drawings in which:

FIG. 1 is an overall perspective view of an electronic clock according to the present invention;

FIG. 2 is an enlarged cross-sectional view taken along the line 2—2 of FIG. 1;

FIG. 3 is a simplified exploded perspective view of the elements of the counting and display electronic clock tube of the clock of FIG. 1 on an enlarged scale;

FIG. 4 is a top view of one of the elements of the tube of FIG. 3;

FIG. 5 is a top view of one of the elements of the tube of FIG. 3;

FIG. 8 is a simplified top view of one of the elements of the tube of FIGURE 3;

FIG. 9 is a simplified bottom view of the element of FIG. 8;

FIG. 10 is a detailed enlarged cross-sectional view, partially cut away, of the counting and display electronic clock tube of the electronic clock of FIG. 1 and is taken along the line 10—10;

FIGS. 11 through 17 are enlarged cross-sectional views of electrical interconnections between the various elements of FIG. 3;

Figure 19B:
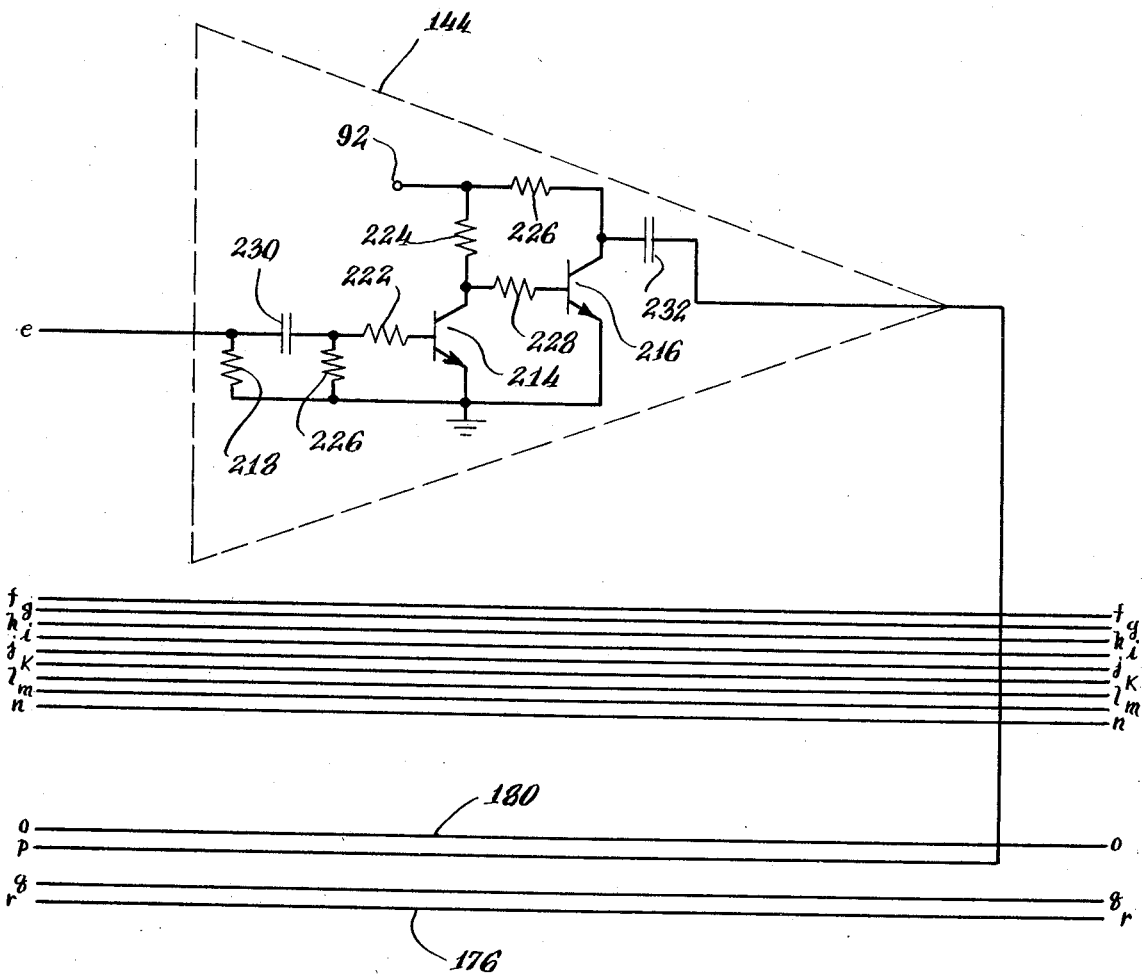
Figure 19C:
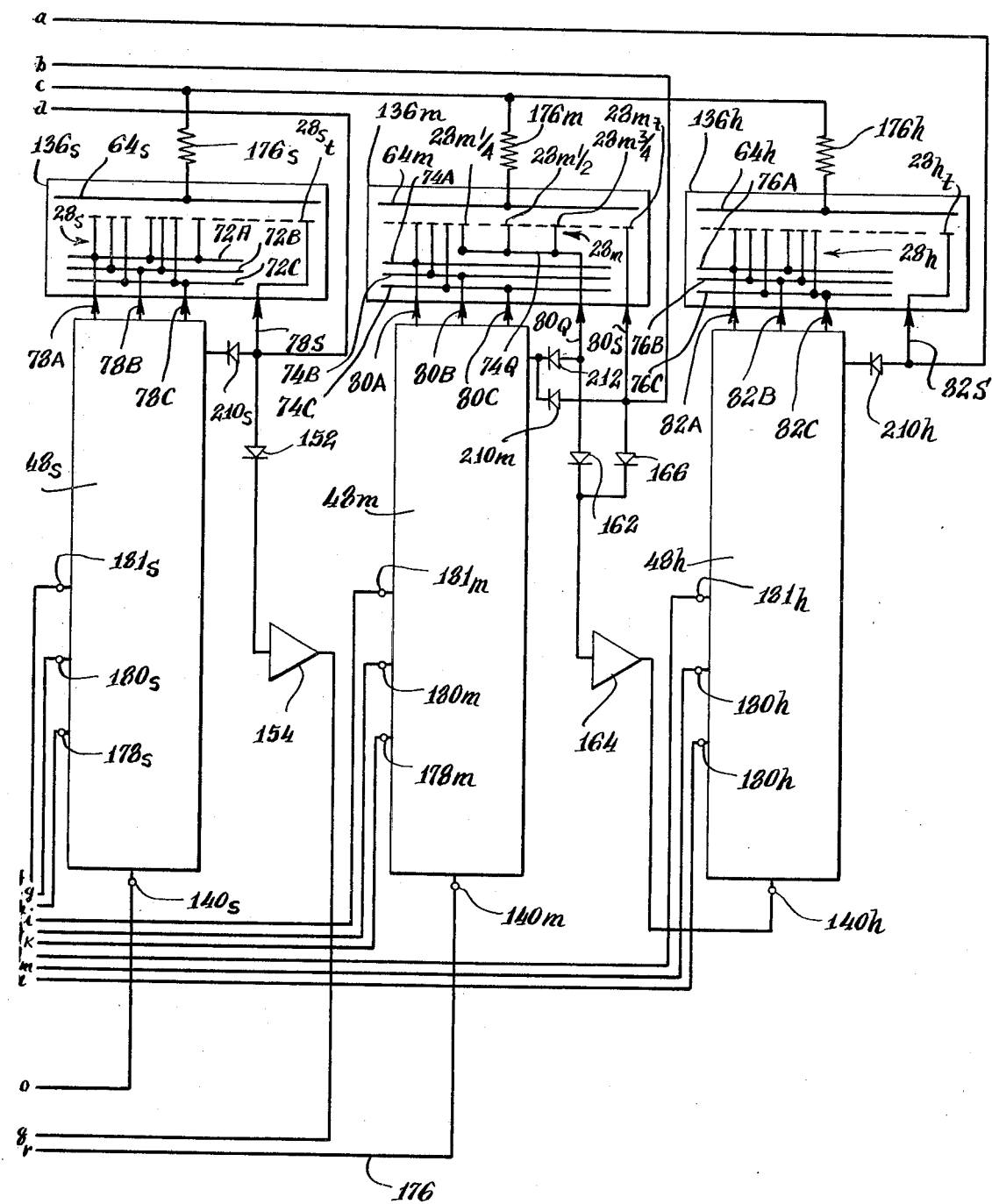
Figure 20:
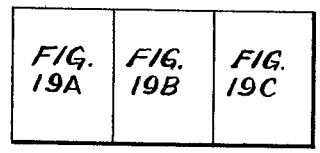

FIGS. 19A, 19B, and 19C are a schematic circuit diagram of the drive circuit of the electronic clock of FIG. 1; and FIG. 20 is a diagram showing how FIG. 19A, 19B, and 19C may be fit together.

The same reference characters refer to the same elements throughout the several views of the drawings.

DESCRIPTION

Now referring to FIGS. 1 and 2, the electronic clock 20 of the invention comprises a case 22 bearing outer dial indicia 24. Mounted within the case 22 is a generally thin, flat electronic clock counting and indicating tube 26. A plurality of glow cathodes 28 are located within the tube 26. Four individual cathodes glow at a time. Three of these indicate the time; $28s$ indicates the second, $28m$ indicates the minute, and $28h$ indicates the hour. When the clock is operated from a sixty cycle power line four frequency glow cathodes $28f$ will be seen due to persistence of vision. They appear to rotate around the face of the clock once each second. The remaining non-glowing cathodes are not visible due to the action of a one-way window 30 overlaying the tube 26. A plurality of contact pins 32 pass through the back of the tube 26. A printed circuit board 34 is mounted thereto. Electrical circuit elements 19 are mounted thereon for controlling the tube 26.

Now referring to FIG. 3, the envelope or case of the electronic tube 26 comprises a flat glass cover plate 36, an open metal cylinder 38, and an annular flat flexible metal ring 42. Metal ring 42 is sealed to glass plate 36 by a glass to metal seal and is welded or soldered to cylinder 38. The tube 26 formed thereby may be partially evacuated through a stem 44 located at the center of bottom 39 of cylinder 38. The bottom of cylinder 38 is made of a material more flexible than the glass front plate 36 and annular ring 42 is made of a material more flexible than either glass plate 36 or cylinder 38. When the envelope is evacuated through stem 44, the bottom 39 of cylinder 38 will flex so that glass cover plate 36 will be supported on a plurality of spacers generally indicated at 46 before vacuum pressure builds up dangerous stress in plate 36. In this way, the clock may be made very thin and flat without placing undue bending stresses on the glass cover plate 36.

Still referring to FIG. 3, a plurality of glow cathodes $28f$, equal in number to the line frequency of the power line to which the clock is to be connected, are arranged in an equally spaced lineal array on a printed circuit board 6. Similarly, 60 second cathodes $28s$, 60 minute cathodes $28m$, and 48 hour cathodes $28h$ are printed on printed circuit board 8. It is an important feature of the invention that all of these glow cathodes 28 are position cathodes. There are no guide or transfer cathodes within the clock tube 26. The cathodes are connected iteratively to three terminals, that is, into a three phase circuit, and are controlled by the electronic circuit means 19, schematically shown in FIGS. 19A, 19B and 19C.

Referring to FIGS. 19A, 19B and 19C, it will be seen by those skilled in the electronic art that the control circuit 19 comprises four tertiary, or three phase, ring counters, $48f$, $48s$, $48m$ and $48h$. Normally, ring counter $48f$ is supplied with pulses at the line frequency at terminal 50. Upon receipt of each pulse, it passes the glow to the next glow cathode $28f$. Similarly, ring counter $48s$ is supplied with pulses derived from one of the glow cathodes $28f_t$, once each second since the number of glow cathodes $28f$ is equal to the line frequency in cycles per second. Thus, the glow of glow cathodes $28s$ is switched once each second. Similarly, the input pulses supplied to ring counter $48m$ are supplied from one glow cathode $28s_t$. Since there are sixty second cathodes $28s$, the glow on minute cathodes $28m$ is switched once each minute. The pulses supplied to the hour ring counter $48h$ are derived from four equally spaced minute cathodes $28m_{1/4}$, $28m_{1/2}$, $28m_{3/4}$, and $28m_t$ so that the hour cathodes are switched each fifteen minutes by ring counter $48h$.

The glow cathodes $28_t$ are preferably commonly oriented, for example, in the preferred embodiment of the invention shown, they are all radially oriented from a common center.

The clock may be set by simultaneously applying an ignition pulse to all of these cathodes, setting the clock to twelve o'clock, no minutes, no seconds, and no cycles of line frequency. The clock may then be advanced to the correct time by applying line frequency pulses to the minutes ring counter $48m$ to advance the minute and hour cathodes at a rate of one hour per second to approximately the correct time. Then the line pulses may be supplied to the seconds ring counter 48s to switch the clock at a rate of one minute per second to set the second and minute hands.

Again referring to FIG. 3, the electronic clock tube 26 is provided with a common anode surface 4 on the back of glass cover 36. This is shown in detail in FIG. 4. Referring to FIG. 4, the anodes comprise four concentric rings 64 of printed conductive meshes, almost invisible to an observer of the clock because of their fineness.

Again referring to FIG. 3, only the glowing cathodes 28 can be seen because of the one-way window 30 comprising a linear polarizer 52 and a quarter wave plate 54. The polarization axis of linear polarizer 52 is oriented at 45° with respect to the fast and slow axes of quarter wave plate 54. Light from outside the clock is first linearly polarized in passing through polarizer 52. It is then converted to left or right circularly polarized light by the quarter wave plate 54 (depending on the orientation of the fast and slow axes of quarter wave plate 54). Upon reflection by a smooth surface left circularly polarized light is changed to right circularly polarized light, and vice versa. The reflected circularly polarized light from inside the clock 26 is converted to linearly polarized light in again passing through quarter wave plate 54. However, as is well known, the plane of polarization of the reflected light is at right angles to the polarization axis of polarizer 52 and the light will be absorbed thereby. Thus, reflected light does not emerge from the clock 26. Light from the glow cathodes 28 inside the clock 26 is not polarized and is thus unaffected by quarter wave plate 54. It is polarized by linear polarizer 52, but this does not affect its visibility. Thus, all reflections within the clock will be suppressed and only light originating from the glow cathodes within the clock may be seen by an observer.

An important feature of the invention is that all of the glow cathodes of the invention are printed on flat substrates as are the anodes of the invention, and as are the interconnections between the cathodes. Some of the latter are made on the backs of boards 6 and 8. A feature of the invention is that interconnections between opposed printed circuits are made by springs 56 (FIGS. 12 and 13), pressing against connection pads 58–59 on oppositely disposed surfaces of printed circuit board 7 and the bottom surface 4 of anode front cover plate 36.

Figure 18:
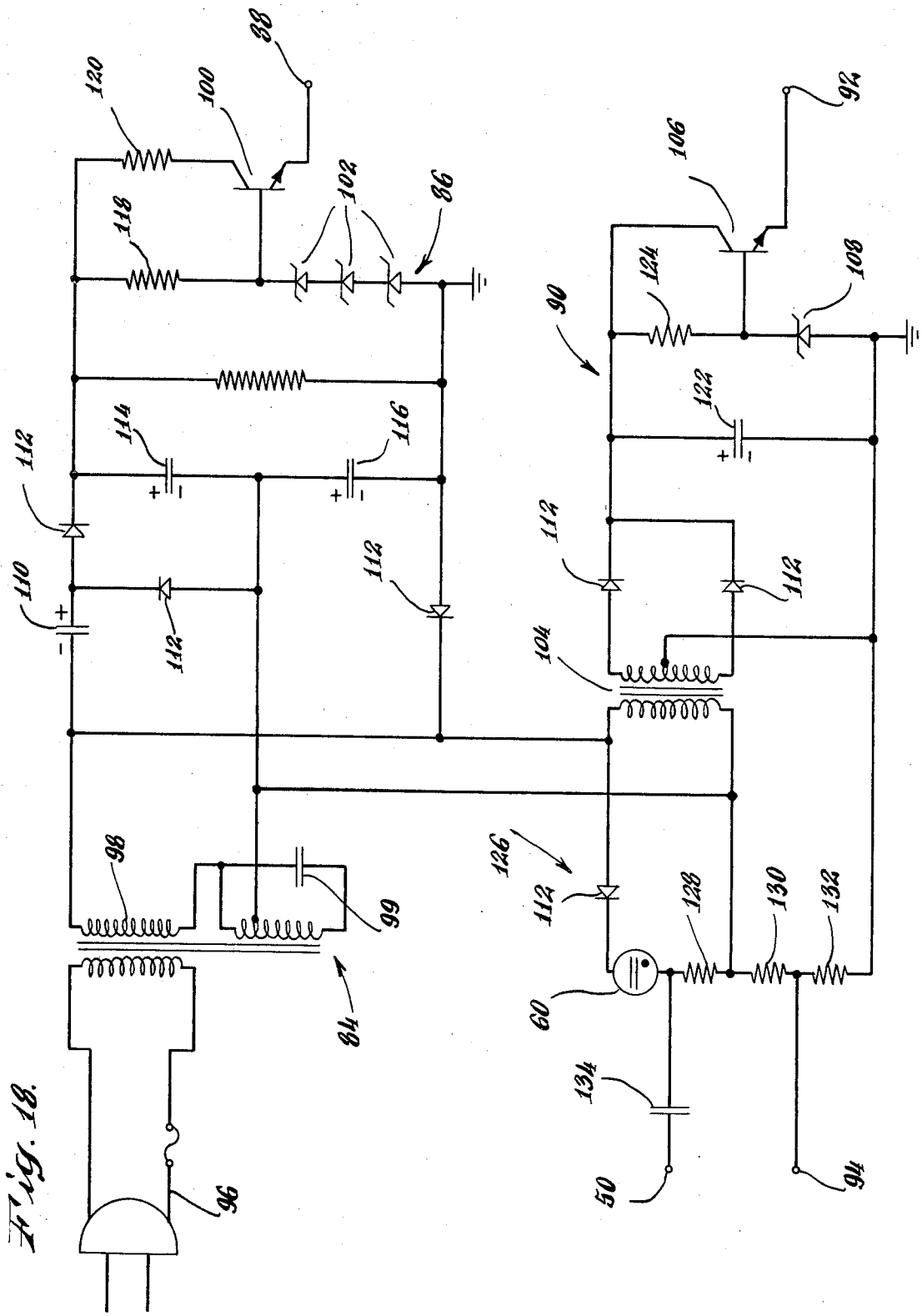
FIG. 18 is a schematic circuit diagram of the power supply of the electronic clock of FIG. 1.

Another feature of the invention, shown in FIG. 18, is a circuit for generating the pulses for driving the line frequency ring counter 48f. This comprises a gas diode 60 that breaks down when the voltage across it exceeds a predetermined value to produce a sharp positive drive pulse at terminal 50. Other similar breakdown devices such as a Zener diode can be used for this purpose. Such breakdown devices are much simpler than the complicated blocking oscillators of the prior art.

SPECIFIC DESCRIPTION

More particularly, referring to FIGS. 1 and 2, as previously explained, the counting and display or electronic clock tube 26 of the invention is located behind the one-way window 30 and has mounted to the pins 32 thereof a printed circuit board 34 bearing electronic circuit means 19. The electronic clock tube 22 and the one-way window 30 are shown in a simplified, enlarged, exploded perspective view in FIG. 3 and in a detailed cross section in FIG. 10.

Now referring to FIGS. 3 and 10, and particularly to FIG. 10, the thin, flexible ring 42 is sealed about the periphery of glass cover plate 36 by a glass to metal seal. Ring 42 is preferably made of stainless steel, and is silver soldered to the periphery of cylinder 38. Cylinder 38 may be made of any structural metal, for example of aluminum, but is preferably stainless steel.

The interior of the electronic clock tube 26 comprises a sandwich of a printed connecting circuit 7; an asbestos insulator 60; printed circuit plate 8 bearing the hour, minute, and second cathodes 28h, 28m, and 28s respectively; annular printed circuit plate 6 bearing line frequency cathodes 28f; and a plurality of spacer rings 46 for supporting the glass plate 36. The spacer rings 46 lie between the cathodes 28 in the assembled clock (FIG. 10). The interior of the electronic clock tube 26 is completely evacuated and then filled with an appropriate gas or gases for supporting a glow discharge, for example, tube 26 may be filled with argon at a pressure of 40 to 50 torr.

The tube is first evacuated through the stem 44, the appropriate gas mixture is put in the tube, and the stem is sealed. Milled grooves 62 (FIG. 10) in the surface of the spacer rings 46 permit free movement of gas within the tube during evacuation and filling with the glow discharge gas mixture.

Now, specifically referring to FIG. 4, the back side 4 of the glass plate 36 has printed thereon a plurality of anodes $64h$, $64m$, $64s$, and $64f$ for the hour, minute, second, and line frequency cathodes respectively. The twelve o'clock position is at the bottom of plate 36 as shown in FIG. 4. As seen in FIG. 10, the milled surfaces of spacer rings 46 lie between anodes 64 in the assembled clock. Each of the anodes 64 is provided with an electrical contact pad 58 so that they may be connected by springs 56 (FIGS. 12 and 13) to the contact pads 59 of the circuits on printed circuit board 7. The anodes comprise a series of fine crossed line conductors, which are not perceptible to a viewer of the operating clock.

Figure 17:
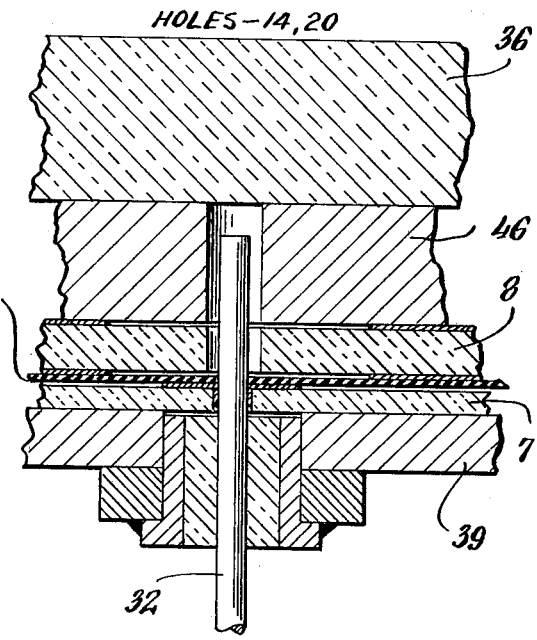

Now referring to FIG. 5, printed circuit board 7 is shown in detail. The twelve o'clock position is at the top of board 7 as shown in FIG. 5. It is provided with a plurality of pads 59 which contact the springs 56 shown in FIGS. 12 and 13. Common numerical subscripts on the pad numbers in FIGS. 4 and 5 indicate that those pads are connected together by a common spring 56. The subscript numbers also identify the appropriate detailed cross section of FIGS. 12 or 13 of the spring contact in detail. The contacts $64h_{14}$, $64m_{20}$, $64s_{23}$, and $64f_{30}$ have holes in the middle thereof to accommodate a feedthrough pin 32 and are referenced by their subscripts to the cross sections of FIGS. 11 and 17.

Figure 6:
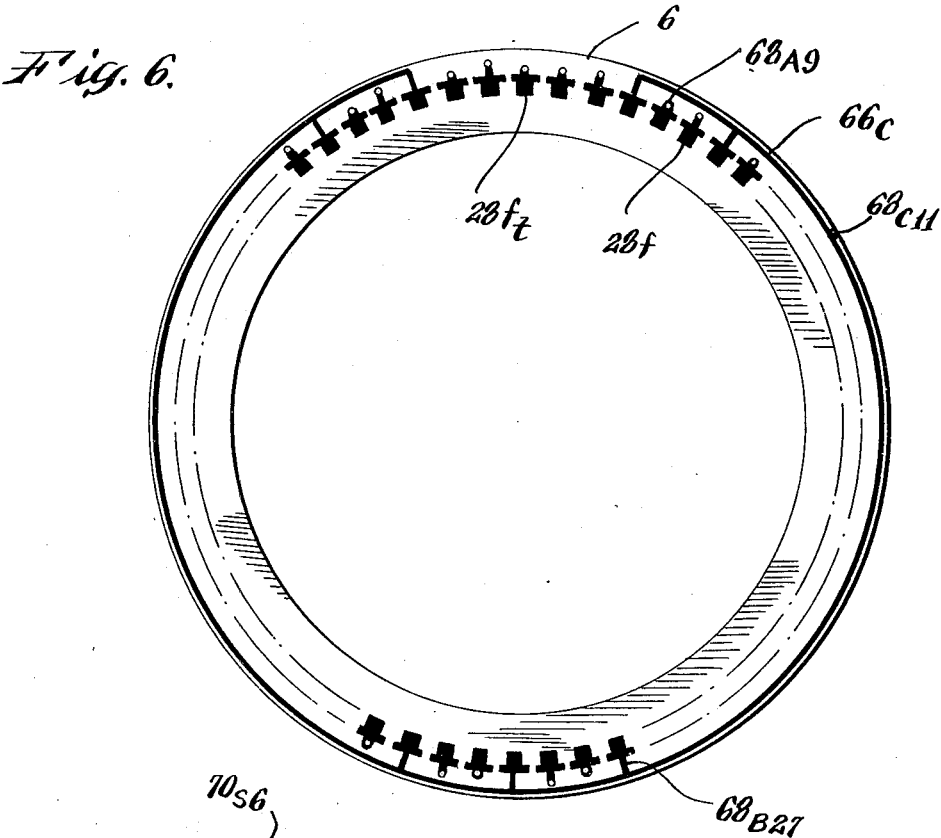
FIG. 6 is a top view of one of the elements of the tube of FIG. 3.
Figure 15:
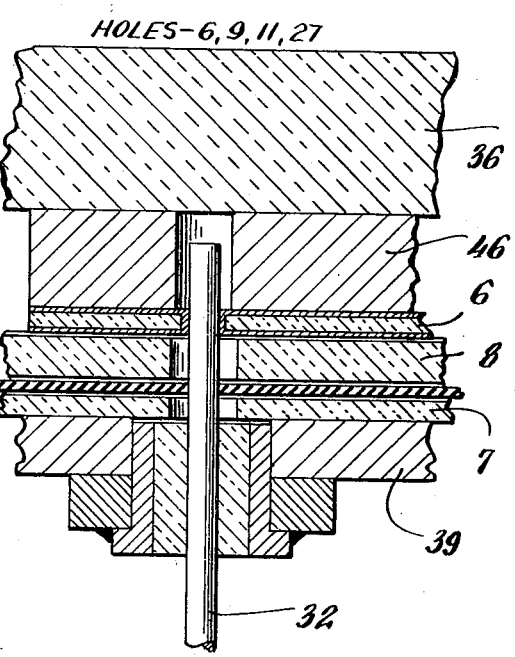

Now referring to FIG. 6, the line frequency cathodes $28f$ are printed on annular circuit substrate 6. The cathodes $28f$ are equally spaced, as shown. All except the twelve o'clock position cathode $28f_t$ are connected to three circuits via printed conductors 66A, 66B, and 66C on the front (FIG. 6) and back (FIG. 7) sides thereof. The connections to conductors 66A and 66B are made by printed through connections at each of the cathodes $28f$ connected thereto. Connections are made to feedthrough pins 32 at contact points $68A_9$, $68B_{27}$, and $68C_{11}$, the three terminals of the three phase circuit. Additionally, a connection is made at the twelve o'clock position cathode $28f_t$ to a pin 32 (FIG. 11) at terminal $70S_6$; the subscript referring to the cross section of FIG. 15.

Figure 14:
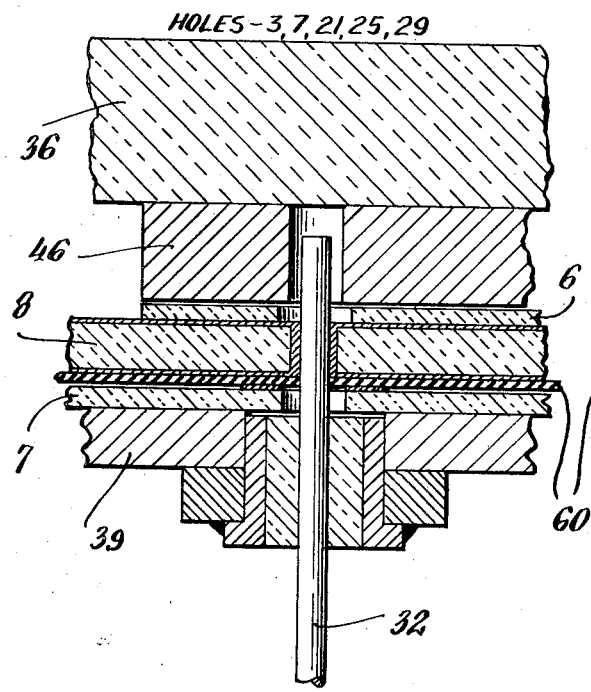
Figure 16:
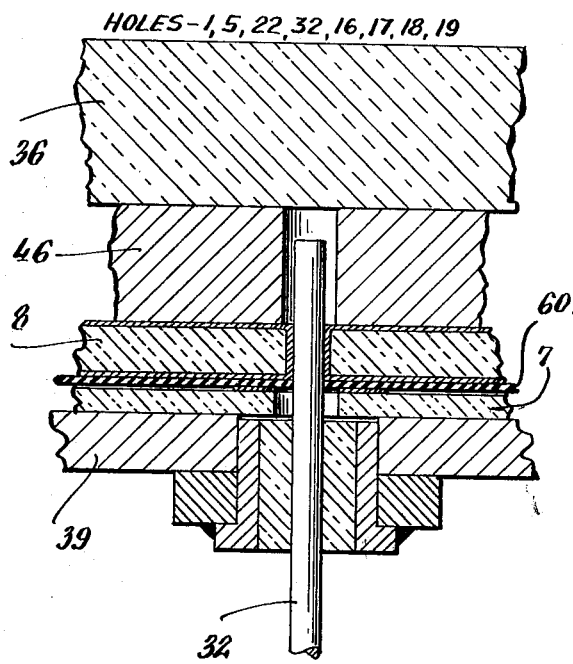

Now referring to FIGS. 8 and 9, the hour, minute, and second cathodes 28h, 28m, 28s are printed on printed circuit substrate 8. The second cathodes 28s (except for the twelve o'clock position cathode $28s_t$) are connected into three circuits by conductors 72A, 72B, and 72C; the minute cathodes (except for twelve o'clock position cathodes $28m_t$ and the quarter hour cathodes $28m_{1/4}$, $28m_{1/2}$, and $28m_{3/4}$) by conductors 74A, 74B, and 74C; and the hour cathodes (except for twelve o'clock position cathode $28h_t$) by conductors 76A, 76B, and 76C. The second conductors 72 are connected to pins 32 at terminals $78A_{22}$, $78B_{32}$, and $78C_1$. The twelve o'clock position cathode $28s_t$ is connected to a pin 32 at terminal $78S_5$. Similarly, minute conductors 74 are connected to feedthrough pins 32 at terminals $80A_3$, $80B_{25}$, and $80C_{29}$, and the fifteen minutes past, thirty minutes past, and forty-five minutes past cathodes $28m_{1/4}$, $28m_{1/2}$, and $28m_{3/4}$ are connected together by conductor 74Q and to a pin 32 at terminal 80Q$_{21}$. The twelve o'clock minute cathode 28$m_t$ is connected to a pin 32 at terminal 80S$_7$. Similarly, the hour conductors 76 are connected to feedthrough pins 32 at terminals 82A$_{19}$, 82B$_{18}$, and 82C$_{17}$, and the twelve o'clock position hour cathode is connected to a pin 32 at terminal 82S$_{16}$. In all cases the subscript refers to the hole position and corresponds to the appropriate cross sections of FIGS. 14 and 16.

All of the above-described glow cathodes, anodes, and printed circuits are copper. The glow cathodes and anodes may be of any other material known in the art for this purpose, e.g. molybdenum or tantalum. The cathodes and printed circuits are preferably printed on substrates or printed circuit boards made of a material having a low vapor pressure at elevated temperatures. This is because if the tube 26 contains other materials they will very quickly contaminate the glow cathodes interfering with their operation. Thus, the circuit boards 6, 7, and 8 are preferably glass or a ceramic material and the insulator 60 may be of prefired asbestos or other soft insulating material that does not outgas. As will be apparent to those skilled in the art, the insulator 60' also serves the function of a cushion taking up any slight variations in thickness of the materials in the interior of the tube 26 so that the glass 36 will be evenly supported on the spacers 46.

Now referring to FIG. 18, the power supply 84 for the electronic clock 20 comprises a voltage tripler power supply 86 supplying a potential of 400 volts above ground at terminal 88. A lower voltage source 90 produces a voltage of 40 volts above ground at terminal 92 and a voltage of 100 volts above ground at terminal 94. A series of positive pulses at the line frequency is also provided at terminal 50.

The 60 cycle line voltage is supplied by a line cord 96 to a constant voltage transformer 98. A 3 microfarad, 330 volt capacitor 99 is connected thereto, as shown, to provide voltage regulation. The output of the regulated voltage transformer 98 is connected to power supply 86. Power supply 86 comprises a power transistor 100. The voltage at terminal 88 is regulated by three Zener diodes 102 connected in series to the base thereof and to the ground.

The regulated line voltage is also fed to transformer 104 of a low voltage source 90. Low voltage source 90 comprises power transistor 106 and employs a Zener reference diode 108 connected between ground and the base of transistor 106 to regulate the voltage at terminal 92.

Power supplies 86 and 90 are conventional. Transformer 98 may be a Sola 20–14–30. Transistor 100 may be a Delco DTS 413. Zener diode 102 may be rated at 200, 150 and 50 volts and are capable of each dissipating three watts. Transformer 104 may be a Triad R204A 40-0-40. Transistor 106 may be a 2N35–83. Zener diode 108 has a 40 volt 3 watt rating. Capacitor 110 is rated at 100 microfarads 250 volts connected as shown. Diodes 112 are each type BIE5. Capacitor 114 is 100 microfarads, 450 volts, and capacitor 116 is 100 microfarads, 250 volts, each connected as shown. Resistor 118 has a resistance of 15 kilohms rated at 2 watts. Resistor 120 has a resistance of 2 kilohms rated at 2 watts. Capacitor 122 is 150 microfarads rated at 150 volts, connected as shown. Resistor 124 is 1.5 kilohms rated at one-half watt.

The line frequency is also applied to a pulse generator generally indicated at 126 comprising rectifier diode 112, neon tube 60, and a voltage divider network comprising resistors 128, 130 and 132. Thus, the positive half of the line voltage cycle is supplied to neon tube 60 and it breaks down when the potential there across exceeds its 80 volts breakdown voltage. The pulses, thus formed, are coupled through a .047 microfarad capacitor 134 to terminal 50.

Thus, are provided simple means for deriving series of positive pulses at the line frequency. Neon tube 60 is a NE2A. Resistors 128 and 130 have a value of 47 kilohms. Resistor 132 is 82 kilohms. Each is rated at one-half watt.

FIGS. 19A, 19B, and 19C, may be put together as shown in FIG. 20. The small letters $a$ through $r$ at the right and left sides of FIGS. 19A and 19C, respectively, and at both sides of FIG. 19B identify conductors appearing on more than one sheet of the drawings. The electronic clock 20 of the present invention can be considered to comprise a line frequency pulse counting and display circuit 136$f$, a seconds counting and display circuit 136$s$, a minutes counting and display circuit 136$m$, and an hours counting and display circuit 136$h$. Movement of the glow discharge within each of the counting and display circuits 136 is under control of a respective ring counter control circuit 48$f$, 48$s$, 48$m$, and 48$h$.

The line frequency pulses developed at terminal 50 of FIGS. 18 and 19A are supplied to the input terminal 140$f$ to drive the ring counter 48$f$. Upon receipt of each line frequency pulse at input terminal 140$f$, ring counter 48$f$ switches the glow to the next adjacent cathode 28$f$. As there are as many cathodes 28$f$ as there are line frequency pulses per second, the glow will be switched to the last position cathode 28$f_t$ once each second. Upon ignition the cathode 28$f_t$ will go positive and a positive pulse will be transmitted through diode 142 to an interstage amplifier 144 (FIG. 19B). The pulse is amplified and shaped therein and passes through contacts 146 and 148 of switch 150 (FIG. 19A) and is supplied to the input terminal 140$s$ of the ring counter 48$s$.

Upon receipt of each positive pulse each second at terminal 140$s$, ring counter 48$s$ switches the glow to the next adjacent cathode 28$s$ of the seconds counting and display portion 136$s$ of the electronic clock. Once each minute the glow will be switched on at cathode 28$s_t$ and it will go positive. This will produce a positive pulse passed by diode 152, amplified and shaped in amplifier 154, passing through contacts 156 and 158 of switch 150 and supplied at the input terminal 140$m$ of ring counter 48$m$.

Ring counter 48$m$ switches the glow to the next adjacent cathode 28$m$ of the minute counting and display section 136$m$ once each minute upon receipt of a positive pulse at input terminal 140$m$.

Every fifteen minutes one of the quarter hour cathodes, 28$m_{1/4}$, 28$m_{1/2}$, or 28$m_{3/4}$, will go positive. As they are all connected together to terminal 80Q, a positive pulse will be supplied through diode 162 to amplifier 164. Similarly when cathode 28$m_t$ glows once each hour, on the hour, a positive pulse will be passed through diode 166 to amplifier 164. Thus, a positive pulse amplified and shaped by amplifier 164 will be presented to terminal 140$h$ each fifteen minutes.

In response thereto hour ring counter 48$h$ will switch the glow to the next adjacent cathode 28$h$ of the hour counting and display portion 136$h$ of the clock.

As the circuits of the ring counters 48 are identical, only one ring counter 46$h$ has been shown in detail. Similarly, since the amplifiers 144, 154, and 164 comprise the same circuit, only one of them, amplifier 144, has been shown in detail.

Figure 7:
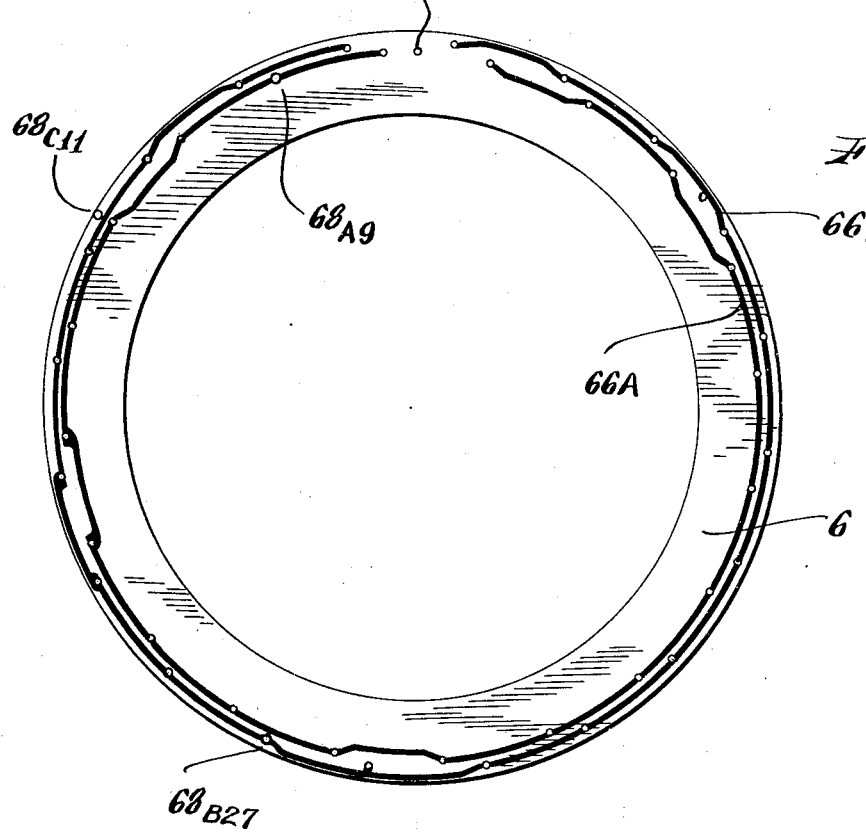
FIG. 7 is a bottom view of the element of FIG. 6.

It should be noted that there are no guide or transfer cathodes within the counting and display sections 136 of the electronic clock of this invention. Rather the lineally arrayed cathode 28 are connected into a three-phase circuit and they are controlled by the ring counters 48. Thus, the line frequency counting and display portion 136$f$ provides control terminals 68A, 68B, and 68C (FIGS. 6, 7, and 19A). Referring to FIGS. 8, 9, and 19C, the seconds counting and display portion 136$s$ provides terminals 78A, 78B, and 78C. The minutes counting and display portion 136$m$ provides terminals 80A, 80B, and 80C. The hours counting and display portion 136$h$ provides terminals 82A, 82B, and 82C.

There are three potentials that must be borne in mind in understanding the operation of multi-cathode gas discharge devices such as the units 136 shown in FIGS. 19A, 19B and 19C hereof. These are called herein the breakdown voltage, the maintaining voltage, and the transfer voltage. The breakdown voltage is a characteristic of the gas, the gas pressure, and the electrode spacing. In the disclosed embodiment of the present invention where the cathode to anode spacing is approximately 2 mm., the breakdown voltage is approximately 300 volts. That is, if a potential of 300 volts is applied between any cathode and anode of a unit 136, a discharge will occur. As is well known, the potential between the burning cathode and anode will then immediately fall to the maintaining voltage which is a characteristic of the gas, the gas pressure, and the cathode material. In the case of argon at approximately 40 torr, and copper cathodes, this is approximately 230 volts. For further understanding of the characteristics of such multi-cathode gas devices, reference may be made to such texts as: Acton & Swift, Cold Cathode Discharge Tubes, Academic Press, Inc., New York (1963); Rudolf Seeliger, Angewandte Atomphysik, Julius Springer, Berlin (1938); and Leonard B. Loeb, Basic Processes of Gaseous Electronics, 2nd edition, University of California Press (1955).

There is a third potential, called herein the transfer voltage, which is very important in understanding the operation of the present invention. While normally in order to initiate a discharge between any cathode and anode, the breakdown voltage of 300 volts would have to be applied, this is not true of cathodes closely adjacent to a burning cathode. This is because stray ions from the glowing cathode are continuously supplied to the gaps between the adjacent cathodes and the anode. Thus, the adjacent cathode to anode gaps are partially ionized. This reduces the breakdown potential between the adjacent cathodes and the anode. For the next adjacent cathode to a burning cathode, it is necessary to simply supply this reduced potential called herein the transfer potential.

Still referring to FIG. 19A, normally all cathodes 28 in each counting and display unit are connected to ground through terminals 68A, 68B, and 68C and associated cathode resistors 174A, 174B, and 174C. Similarly, the anode is connected through an anode resistor 176*f* to high voltage supply terminal 88. Resistors 174 are 3.3 kilohm, 1 watt resistors and resistor 176*f* is a 82 kilohm, 2 watt resistor. Resistors 174 in ring counters 48*s*, 48*m*, and 48*h* and resistors 176*s*, 176*m*, and 176*h* (FIG. 19C) are appropriately chosen to provide the required maintaining voltages for their electrode spacing. Thus, the 230 volt maintaining voltage is supplied between each anode 64 and all cathodes 28.

Referring to FIG. 19A, assume that cathode 28B is glowing. The potential between anode 64*f* and cathode 28B will then always be 230 volts. Anode resistor 176*f* and cathode resistor 174B have been chosen to have values which limit the current of the glow discharge as is conventional in the glow discharge art. In the embodiment disclosed herein, where the cathodes 28 are spaced approximately 1 mm. apart at their closest approach, the transfer voltage is approximately 265 volts. That is, a discharge may be initiated between adjacent cathodes 28A and 28C when cathode 28B is glowing by applying a potential of approximately 265 volts between cathode 28A or cathode 28C and anode 64*f*.

The transfer potentials are supplied by ring counter 48*f*. Note that there is a large capacitance, comprising capacitors 188 and 204 across each cathode resistor 174. This capacitance insures that the potential at a glowing cathode cannot change rapidly. When cathode 28B is glowing and it is time to turn on cathode 28C and turn off cathode 28B, ring counter 48*f* supplies a negative 40 volt signal to terminal 68C. All cathodes connected thereto including cathode 28C thus have a potential with respect to the anode 64*f* 5 volts above the required transfer voltage of 265 volts. However, cathode 28C is the only cathode connected to terminal 68C by bus 66C that is adjacent to the glowing cathode 28B. Thus, only cathode 28C will begin glowing. When cathode 28C begins glowing, a large additional current flows through anode resistor 176*f*. This drops the voltage at the anode. The capacitance connected across resistor 174*b* insures that the cathode potential does not change. Since the anode potential has dropped, the maintaining voltage is no longer applied between cathode 28B and anode 64*f* and cathode 28B is turned off. The negative signal supplied to terminal 68C, of approximately 40 volts, is large enough to keep cathode 28C glowing during this switching operation and it will remain glowing. Thus, cathode 28B is turned off, and cathode 28C is turned on.

Note that the counting and display unit 136*f* could be run backwards. For example, if the cathode 28B were glowing, a negative switching signal could be supplied to terminal 68A. This would turn cathode 28A on rather than cathode 28C.

Now referring to FIGS. 1 and 2, the clock 20 provides three manual control switches: a twelve o'clock preset switch 166, a ring counter preset switch 168, and a time setting switch 150. This latter switch has three positions: fast, run, and very fast and is spring biased so that it is normally in the run position. When it is desired to set the clock, switch 150 may be turned to the very fast position (VF) and the minute glow will be advanced at the line frequency rate. When the switch 150 is released, it returns to the run position (R) and the clock runs at its normal rate. Switch 150 may then be turned to the fast (F) position and the second hand will be advanced at the line frequency to precisely set the clock. Again when switch 150 is released, it will return to the run position and the clock will run at its normal rate. The contacts of the switches, 150, 166, and 168, are shown in FIG. 19A.

Now referring to FIGS. 19A, 19B and 19C, when the clock is initially turned on, the positive 400 volt potential at terminal 88 (FIG. 19B) will be presented from the anodes 64 to all of the position cathodes 28. This exceeds the breakdown voltage and one of the cathodes 28 at each section 136 of the clock will ignite.

Alternatively, the potential at terminal 88 could be chosen such that no cathode ignites when the clock is initially turned on, as more fully explained below.

In order to synchronize the clock, means are provided for selectively igniting all of the twelve o'clock position cathodes 28*t*. Referring to FIG. 19A, capacitor 170 is normally connected by switch 166 between 100 volt positive supply terminal 94 and ground. When the clock is initially plugged in, capacitor 170 charges. Manual operation of the twelve o'clock preset switch 166 reverses the connections of capacitor 170 and supplies a 100 volt negative signal through blocking diodes 172 to each of the twelve o'clock position cathodes 28*t*. Thus, there is now 330 volts potential between each anode 64 and its respective twelve o'clock position cathode 28*t*. As this is above the 300 volts breakdown voltage, all the twelve o'clock position cathodes will ignite. The additional anode current will drop the cathode to anode potential for all other cathodes below the maintaining voltage and any burning cathodes will be extinguished. The clock hands will thus be synchronized. This will be so even if no cathode ignites when the clock is initially turned on. Capacitor 170 is a 50 microfarad 150 volt capacitor. Diodes 172 and all other diodes in the circuit of FIGS. 19A, 19B and 19C are Sylvania type 1N462.

After the clock has been synchronized at the twelve o'clock position, it will run normally, responding to the positive line frequency pulses supplied at terminal 50 (FIG. 19A). In order to advance the clock to the correct time, one turns switch 150 to the very fast position. This causes contact 158 to disconnect from contact 156 and to connect to contact 174 of switch 150. The line frequency pulses are thus supplied via conductor 176 to control terminal 140*m* of the minute ring counter 48*m*. The minute and hour hands will advance at a rapid rate until switch 150 is released, preferably just prior to the clock's showing the correct time. Switch 150 is then turned to the fast position. Contact 148 will disconnect from contact 146 and will connect to contact 178 to supply line frequency pulses via conductor 180 to control terminal 140s of the seconds ring counter 48s. The clock will now advance at the rate of one minute per second and thus the accurate setting of the clock may be completed.

Ring counters 48 are essentially conventional. They each comprise silicon controlled rectifiers (hereinafter called SCR's) $Q_A$, $Q_B$, and $Q_C$ which may be GE type 6CF. Therefore, only ring counter 48f will be described in detail. The cathode of SCR $Q_A$ is connected to terminal 178f. The cathodes of SCR's $Q_B$ and $Q_C$ are connected to terminal 180f. Normally, terminal 178f is connected to terminal 180f by terminals 182f of SCR preset switch 168. Each SCR has a plurality of electrical elements connected in circuit therewith having identical values and functions. These elements are given the same reference number herein followed by an A, B or C identifying the associated SCR having the same subscript. A resistor 184 is connected between the cathode and the gate of each SCR. The anodes of each SCR are connected through a resistor 186 to terminal 92 which is at 40 volts positive potential supplied by the power supply (see FIG. 18).

The anode of each SCR is connected through a capacitor 188 to ground. The anode of each SCR is connected to the gate of each succeeding SCR through a resistor 190 and a capacitor 192 connected in series. The connecting terminal between each resistor 190 and capacitor 192 is connected through a diode 194 to terminal 140f. Terminal 140f is connected through resistor 196 to ground.

Terminal 178f is connected through a series connected resistor 198 and inductor 200 to ground. Terminal 180f is connected through diode 202 to ground.

Each of the SCR's, during its switching operation, supplies a signal to a terminal 68 through a network comprising a capacitor 204 connected in series with a diode 206 and resistor 208 connected in parallel.

The SCR's $Q_A$, $Q_B$, and $Q_B$ are connected such that one of them must be in the conducting state at all times. Assuming that SCR $Q_B$ is conducting, there is essentially no voltage across its cathode to anode junction. The values of the resistances in the network are chosen such that the potentials of the gates of the SCR's $Q_A$, $Q_B$, and $Q_C$ are positive enough for them to fire and $Q_B$ remains conducting.

The positive pulses at terminal 140f are applied to steering diodes 194. Diodes 194A and 194C are backed biased by the positive potential at the anodes of $Q_A$ and $Q_C$. Diode 194B is, however, forward biased by the essentially ground potential at the anode of $Q_B$. Thus, a positive pulse at terminal 140f will not pass through the steering gate of diodes 194A or 194C to positively bias the gates of $Q_B$ or $Q_A$ but will pass through diode 194B to positively bias the gate of $Q_C$, which thereupon fires. The anode of $Q_C$ thereupon goes to approximately ground potential. This negative pulse at the anode of $Q_C$ is supplied through the capacitor 204C and diode 206C to terminal 68C to fire the primed cathode connected thereto.

When SCR $Q_C$ turns on, the cathode thereof instantaneously goes to a positive potential. The forward bias across $Q_B$ is thus removed. This is because: instantaneously no current flows through the coupling capacitors 188C and 192B; the SCR cathodes are connected together; and the current through inductor 200 cannot change instantaneously. This turns off $Q_B$ so that it assumes its non-conducting state.

Similarly, if $Q_A$ is conducting, a pulse applied to terminal 140f will fire $Q_B$ and if $Q_C$ is conducting, a pulse applied to terminal 140f will fire $Q_A$. In this way a negative glow switching signal is applied cyclicly to the terminals 68.

In order for the clock to operate properly, the three ring counters 48 must be synchronized. Ring counter preset switch 168 is provided for this purpose. When it is operated, transfer contacts 182f thereof transfer to momentarily apply approximately ground potential to the anode of $Q_A$ (via terminal 181f) to cause it to assume the conducting state. Transfer of contacts 182s, 182m, and 182h similarly caused the SCR's $Q_A$ of each of the four ring counters 48 to conduct at the same time.

It should be noted that each of the cathodes 28t is connected to the "C" terminal of its ring counter control circuit 48 through an isolating diode 210 as are the quarter hour cathodes, $28m_{1/4}$, $28m_{1/2}$, and $28m_{3/4}$, of the minute counting and display unit 136m through a diode 212. This prevents the twelve o'clock preset negative signal, applied upon operation of switch 166, from affecting the ring counters 48.

The values and types of components employed in the ring counters 48 are as follows: All diodes are type 1N462. Inductor 200 is wound on a Magnetics 55118 core and employs 1200 turns of No. 36 wire. Resistors 184 are 1 kilohm; resistors 186 are 1.8 kilohms; resistors 190 are 18 kilohms; resistor 196 is 47 kilohms; resistor 198 are 270 ohms; resistors 208 are 47 kilohms. Resistors 186 are 2 watt resistors. All other resistors are ½ watt resistors. Capacitors 188 are 0.1 microfarad; capacitors 192 are .0047 microfarad; capacitors 204 are 0.1 microfarad. All capacitors are rated at 100 volts.

When the $28f_t$ cathode ignites, the positive signal supplied thereby passes through diode 142 and is amplified in amplifier 144. Amplifier 144 is a conventional two-stage transistor amplifier, comprising transistors 214 and 216 connected in the network shown with resistors 218, 220, 222, 224, 226 and 228 and capacitors 230 and 232. Transistors 214 and 216 are type 2N717. Resistors 218 and 220 are 15 kilohms as are resistors 224 and 226, resistor 222 is 2.2 kilohms, resistor 228 is 4.7 kilohms; all one-half watt resistors. Capacitor 230 is 0.1 microfarad, capacitor 232 is .001 microfarad, both rated at 100 volts.

It will thus be seen that the objects set forth above among those made apparent from the preceding description are efficiently attained and since certain changes may be made in the construction without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. An electronic clock or counter comprising, in combination:
  (A) a generally flat first plate;
  (B) a generally flat second plate spaced from said first plate,
    (a) said plates joined at their peripheries to form a container;
    (b) the interior space between said plates being partially evacuated, and
    (c) one of said plates being transparent;
  (C) a plurality of glow electrodes disposed in said container arranged to count and display; and
  (D) one or more spacer means clamped by atmospheric pressure between said plates to prevent excessive deformation thereof.

2. An electronic clock comprising the combination of a glow discharge tube containing an ionizable gas and at least two series of spaced internal electrodes disposed within said tube for counting successive time intervals in response to electrical input signals representing said time intervals, the electrodes of each series being radially oriented relative to a common centerpoint so that the movement of a glow discharge along said electrodes simulates the movement of a clock hand, a first group of said electrodes in each series being interconnected to form a first cathode group and a second group of electrodes in the same series being interconnected to form a second cathode group with one of the cathodes of said first group being located between each pair of successive cathodes of said second group, and one of the cathodes of said second group being located between each pair of successive cathodes of said first group, and electronic control means including means for initiating a glow discharge at one of said electrodes in each electrode series, means for applying a transfer potential for said glow discharge tube cyclically to said first and second cathode groups in each series in response to said electrical input signals so as to repetitively transfer the glow discharge directly between successive cathodes in each series, and means for maintaining said glow discharge at each of said cathodes until the glow discharge is transferred to the next successive cathodes whereby a continual display of the instantaneous time is provided.

3. An electronic clock as set forth in claim 2 further characterized in that a light-transmitting anode is included in said tube.

4. An electronic clock as set forth in claim 2 further characterized in that the electrodes of each of said series are interconnected to form three cathode groups with each pair of successive electrodes in one group being spaced apart by at least one electrode from each of the other two groups, and said electrical control means is operatively connected to said three cathode groups for applying a transfer potential for said glow discharge tube cyclically to said three groups, one group at a time, whereby said transfer potential is always applied to only one cathode directly adjacent a glowing cathode so as to step the glow discharge along successive cathodes in the series in a predetermined direction.

5. An electronic clock as set forth in claim 2 further characterized in that said means for applying said transfer potential cyclically to said cathode groups includes an electronic ring counter and means for supplying repetitive input pulses to said ring counter at a constant frequency.

6. An electronic clock as set forth in claim 2 further characterized in that said tube includes a light-transmitting wall member including light polarizing means that is substantially transparent to light from a source on either side thereof but substantially opaque to light that is passed therethrough and then reflected.

7. An electronic clock as set forth in claim 6 further characterized in that said polarizing means comprises means for converting light passing therethrough and toward said electrodes into circularly polarized light.

8. An electronic clock as set forth in claim 6 further characterized in that said polarizing means comprises a linear polarizer and a quarter wave plate.

9. An electronic clock as set forth in claim 6 further characterized in that at least a portion of one wall of said glow discharge tube is more flexible than the other walls thereof to avoid excessive stress on the components of said tube during evacuation of the tube prior to filling the same with said ionizable gas.

References Cited

UNITED STATES PATENTS

| | | | |
|---|---|---|---|
| 2,491,453 | 12/1949 | Knobel | 58—52 |
| 2,055,982 | 9/1936 | Nicolson | 58—26 |
| 2,410,156 | 10/1946 | Flory | 58—26 |
| 3,195,011 | 7/1965 | Polin | 58—26 |

FOREIGN PATENTS 987,231   3/1965   Great Britain.

RICHARD B. WILKINSON, Primary Examiner

E. C. SIMMONS, Assistant Examiner

U.S. Cl. X.R.

58—23